Nov. 17, 1925.
R. M. LOVEJOY
1,561,872

PROCESS OF PERMANENTLY SEALING AN APERTURE AND THE SEAL THEREFOR

Filed March 26, 1925

Inventor.
Ralph M. Lovejoy
by Heard Smith & Tennant.
Attys

Patented Nov. 17, 1925.

1,561,872

UNITED STATES PATENT OFFICE.

RALPH M. LOVEJOY, OF BOSTON, MASSACHUSETTS.

PROCESS OF PERMANENTLY SEALING AN APERTURE AND THE SEAL THEREFOR.

Application filed March 26, 1925. Serial No. 18,469.

*To all whom it may concern:*

Be it known that I, RALPH M. LOVEJOY, a citizen of the United States, and a resident of Boston, county of Suffolk, State of Massachusetts, have invented an Improvement in Processes of Permanently Sealing an Aperture and the Seal Therefor, of which the following description, in connection with the accompanying drawing, is a specification, like characters on the drawing representing like parts.

This invention relates to improvements in processes of effectively sealing apertures and in closures therefor and the object of the invention is to provide a simple and effective means for permanently sealing such apertures.

More particularly the invention consists in providing a cylindrical countersink in the wall of the aperture and closing the aperture by expanding a conical plate or seal into the countersink by resultant expansive forces which act in straight lines extending from the apex of the seal to the basal periphery thereof.

I am aware that for many years it has been customary to seal apertures, such, as, holes in castings by boring a countersink in the wall of the aperture of somewhat larger diameter than the aperture and placing therein a curved metallic plate, such as a piece of boiler plate or specially formed circular segments of a hollow sphere, but I have found by experience that either of these methods of sealing apertures is defective for the reason that the plate becomes more or less crimped as it is forced into the plates and does not engage the wall of the countersink with sufficient pressure to form an effective seal. Furthermore, when pressure is applied within the aperture such seals are often readily detached. By the present invention these objections are overcome and a permanent seal produced which will withstand high pressures without leaking and without detachment of the seal.

I am also aware that seals for liquid containing receptacles, such as milk bottles have been used for many years in which the mouth of the bottle is provided with a countersink into which a disk of fibrous material, usually paper, of larger diameter than the cylindrical wall of the countersink, is forced by pressure so that the seal assumes an inwardly curved position with respect to the body of the receptacle. This, however, differs materially from the present invention as will be readily understood.

The process embodying the invention and the form of seal is graphically illustrated in the accompanying drawing, in which, Fig. 1 is a perspective view of the form of seal;

Figure 1:
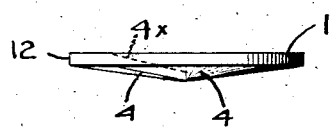
Figure 2:
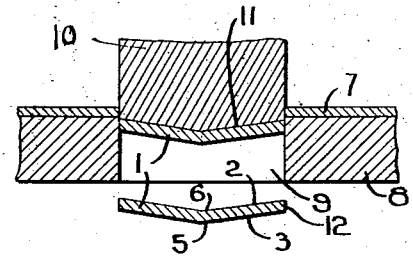
Fig. 2 is a vertical sectional view illustrating the manner in which the seal is formed by punching the same from a plate, one of the seals being shown in the position in which it is discharged by the punch.
Figure 3:
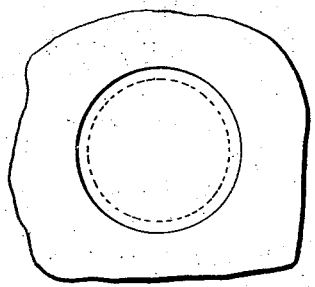
Fig. 3 is a plan view of a body of material having an aperture therein the wall of which is provided with a cylindrical countersink of larger diameter than the aperture.
Figure 4:
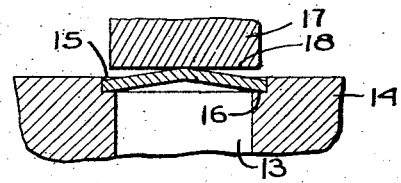
Fig. 4 is a vertical sectional view of a portion of a body of material having an aperture therein with the seal placed in the countersink and illustrating also a preferred form of plunger for forcing the seal into place.
Figure 5:
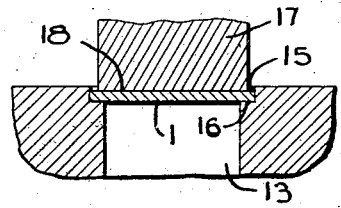
Fig. 5 is a detail view showing the portion of the body of material having an aperture therein with the seal in place.
Figure 6:
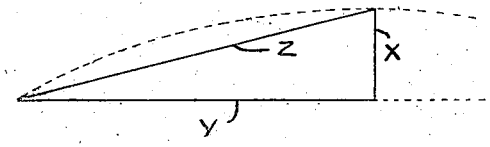
Fig. 6 is a diagrammatic view illustrating the components of the resultant effective force of pressure applied to the apex of a conical sealing plate and also illustrating in dotted lines the position of a spherically curved sealing plate relatively to such component lines of force.

The seal embodying the present invention as illustrated in Figs. 1 and 2 is in the form of a piece or plate 1 of material, having a permanent set when expanded, of uniform thickness and slightly conical form in which the outer and inner surfaces 2 and 3 of the wall of the piece or plate correspond respectively to paths of revolutions of straight lines 4 and $4^x$ respectively about the outer and inner apexes 5 and 6.

A preferred method of forming the plate is illustrated in Fig. 2 in which a plate of metal, or other material 7 of uniform thickness, is placed upon a bed or die 8 having a circular aperture 9 therethrough and the closure piece or plate 1 stamped from the plate 7 by a punch 10 which closely fits the wall of the aperture 9 and is provided with a conical end 11 which engages the plate. As the punch 10 is forced downwardly upon the plate by any suitable means the material of the plate 7 is first bent to conical form to conform to the end of the punch and upon further descent of the punch the metal is sheared between the wall of the punch and the wall of the aperture so that a conical piece is discharged having a cylindrical basal periphery 12, the wall of which is substantially parallel to the axis of the cone thus formed.

In the process of using this closure to form a permanent seal for an aperture 13 in a body of rigid material 14, the wall of the aperture is provided with a cylindrical countersink 15 which presents an annular base 16 surrounding the aperture. The conical sealing piece of plate 1 is placed upon the base 16 of the aperture and is expanded to a flat position by pressure which is applied to the apex of the cone, preferably by a plunger 17 having a flat face 18 engaging the seal and moving in the direction of the axis of the cone. By reason of the fact that the conical piece or plate is of uniform thickness and has outer and inner surfaces which corresponds respectively to the paths of revolutions of straight lines about the outer and inner apexes of the conical plate, the resultant lines of force act in straight lines from the apex to the basal periphery of the plate so that the plate is equally expanded in all directions from the axis of the cone. This expansive movement of the disk is a toggle-like action in which the apex of the cone corresponds to the joint of the toggle arms which are in effect of infinite number radiating from the apex of the cone to the basal periphery thereof.

It will be seen by reference to Fig. 8 that the component lines of force X and Y of the resultant line of force Z of the pressure applied to the apex of the plate, the line of force X which is in the direction of the axis of the cone is far less than the component Y which is at right angles thereto and that inasmuch as the lines of force Z are in the direction of straight lines the strength of the material of the disk will avoid buckling of the seal, whereas if the seal is of curved form the component lines of force so act upon the curved disk, that the resultants are not straight lines within the material of the plate and the curved seal is so bent when forced into place as to produce crimps of more or less irregular circular form.

It has been found in actual practice that seals comprising a segment of a hollow sphere which have been crimped during application have fallen out upon slight shock or pressure and also have been subject to leakage, while conical seals embodying this invention and applied by the process herein described have uniformly withstood pressures from one hundred to one hundred and fifty pounds, and even more, without leakage and without displacement.

It is to be understood that the word "conical" and the phrase "paths of revolution of straight lines about the outer and inner apexes of the conical piece or plate" are used in the mathematical sense, but with such interpretation as will make them applicable to mechanical constructions which are necessarily not mathematically perfect.

Having thus described the invention, what is claimed as new, and desired to be secured by Letters Patent, is:

A closure for an aperture, the wall of which is provided with a cylindrical countersink, comprising a plate of rigid material, having a permanent set when expanded, of uniform thickness and of slightly conical form in which the outer and inner surfaces of the wall of the plate correspond respectively to paths of revolutions of straight lines about the outer and inner apexes of the conical plate.

In testimony whereof, I have signed my name to this specification.

RALPH M. LOVEJOY.